United States Patent
Liang et al.

(10) Patent No.: US 6,445,773 B1
(45) Date of Patent: Sep. 3, 2002

(54) DMT TEST METHOD FOR DETERMINING ADSL CAPABILITY OF CABLES

(75) Inventors: Ronald Y. R. Liang, Thornhill; Robert Layton, Aurora, both of (CA)

(73) Assignee: Consultronics Limited, Concord (CA)

( * ) Notice: Subject to any disclaimer, the term of this patent is extended or adjusted under 35 U.S.C. 154(b) by 203 days.

(21) Appl. No.: 09/593,371

(22) Filed: Jun. 14, 2000

(51) Int. Cl.[7] .......................... H04M 1/24; H04M 3/08; H04M 3/22

(52) U.S. Cl. ................. 379/1.04; 379/15.03; 379/22.04; 379/22.01; 379/22.02; 370/248; 370/249; 375/224; 375/225

(58) Field of Search .............................. 379/1.01, 1.03, 379/1.04, 15.03, 22.01, 22.02, 22.04, 26.01, 27.01, 27.02–27.03, 28, 30; 375/224–228; 370/241, 248–249, 251, 252–253

(56) References Cited

U.S. PATENT DOCUMENTS 5,406,635 A * 4/1995 Jarvinen
5,475,711 A * 12/1995 Betts et al.
5,864,602 A * 1/1999 Needle
6,177,801 B1 * 1/2001 Chong

FOREIGN PATENT DOCUMENTS

DE    WO 00/13362    * 3/2000

* cited by examiner

Primary Examiner—Duc Nguyen
(74) Attorney, Agent, or Firm—Kramer & Associates, P.C.

(57) ABSTRACT

A DMT (Discrete Multi-Tone) test method is provided. The test method is employed by two test devices to estimate the theoretical and practical data rates of a cable under test for a pair of target ADSL (Asymmetric Digital Subscriber Line) DMT modems. The present DMT test can also be used to analyze the cause of, or to predict a problem, whereby a pair of ADSL DMT modems could fail to synchronize. The method includes (a) synchronizing two devices at lower frequencies; (b) measuring the frequency characteristics of the cable with test signals; (c) measuring the cable noise and interference for every sub-channel of the ADSL bandwidth; (d) determining the theoretical and practical data rates for every sub-channel, based on the measured frequency characteristics and noise characteristics, as well as modem parameters selected by the user; (e) estimating the theoretical and practical data rates for the ADSL bandwidth based on the ADSL DMT standard selected by the user.

20 Claims, 3 Drawing Sheets

Flow diagram of TU1 as the slave test unit at U-C

A test setup for an ADSL modem test.

Signal Vs Quantization Noise in an ADC.

A test setup for a DMT test on a local loop.

Flow diagram of TU1 as the slave test unit at U-C

Flow diagram of TU2 as the master test unit at U-R

DMT TEST METHOD FOR DETERMINING ADSL CAPABILITY OF CABLES

FIELD OF THE INVENTION

This invention relates to test instrumentation generally and more specifically to instrumentation for testing cables for ADSL (Asymmetric Digital Subscriber Line) application, such as full rate ADSL and G.Lite ADSL.

BACKGROUND OF THE INVENTION

A number of technologies have emerged to make better use of the bandwidth available on existing copper access networks. One of these technologies is xDSL (any of various types of Digital Subscriber Line). The major advantage of high-speed xDSL technologies is that they can all be supported on ordinary copper telephone cables already installed in most commercial and residential buildings. The most promising technology of the xDSL family is ADSL (Asynmmetric Digital Subscriber Line). Full rate ADSL provides downstream data rates of up to 8 Mbps (million bits per second) and upstream data rates of up to 1 Mbps. A subset of full rate standard is G.Lite ADSL, which provides downstream data rates of up to 1 Mbps and upstream data rates of up to 512 Kbps (thousand bits per second) depending on the telephone line condition.

Cable Qualification Test and ADSL Modem Test are two complementary tests required for deploying and troubleshooting ADSL service over the existing copper lines which were originally designed for voice service. Cable Qualification Test is to verify and troubleshoot a cable for an ADSL service by detecting and measuring any impairment of the cable. ADSL Modem Test is to verify the data rate of a cable and to troubleshoot an ADSL service with a data rate that is lower than expected. Without completing a successful ADSL Modem Test, service providers can not estimate the practical data rates for a potential ADSL service by just doing a Cable Qualification Test. On the other hand, a service technician can not tell from a failed ADSL Modem Test what caused the failure unless he or she can carry out a comprehensive Cable Qualification Test.

DMT (Discrete Multi-Tone) modulation is the main technique employed by ADSL modems. It is the standard modulation adopted for use in ADSL systems by ANSI (American National Standards Institute), ETSI (European Telecom Standards Institute), and ITU (International Telecommunications Union). A pair of ADSL DMT modems will operate in Frequency Division Multiplexing (FDM) or Echo Cancellation Mode by dividing the available frequency bandwidth into up to 256 sub-channels, or tones. Each sub-channel is modulated using QAM (Quadrature Amplitude Modulation) and carries between 0 to a maximum of 15 bits/symbol/Hz. The number of bits assigned to each sub-channel is based on the measured Signal to Noise Ratio (SNR) of the cable within the sub-channel. Also, each sub-channel's data rate may be dynamically adjusted to adapt to the varying telephone line characteristics. The overall downstream and upstream data rates of the cable will be the total data rates of those sub-channels allocated for the downstream and upstream respectively.

A general connection for an ADSL modem test of a local loop is shown in FIG. 1, where the test unit labeled as ATU-C (ADSL Central Site Terminal Unit; or ADSL Transceiver Unit, Central Office End) is acting as the ADSL modem at the Central Office (CO) and the other one labeled as ATU-R (ADSL Remote Terminal Unit; or ADSL Transceiver Unit, Remote Terminal End) is acting as the ADSL modem at a customer's premises. U-C and U-R stand for the loop interfaces at the CO site and at the remote terminal or customer's premises site. Typically, when doing a field service, one of the test units can be the ADSL device or equipment installed at the CO or at the customer's premises.

The present invention is to provide a powerful and unique tool to estimate the theoretical and practical data rates of a cable for various modem parameters without doing different ADSL modem tests with different sets of ADSL modems. The present DMT test can also be used to analyze the causes of, or to predict a problem respecting, the failure of a pair of ADSL DMT modems to synchronize.

SUMMARY OF THE INVENTION

The invention relates to a DMT (Discrete Multi-Tone) test method. To estimate the theoretical data rates of a cable without employing any ADSL modem, the method measures the frequency characteristics of the cable with discrete tones and adjusts the optimum AGC (Automatic Gain Control) setting for each tone. To estimate the practical data rates of a cable without employing any ADSL modem, the method measures the frequency characteristics of the cable with discrete tones and determines the data rate based on the ADSL DMT standard and modem parameters selected by the user. By synchronizing at lower frequencies, such as voice band frequencies, the method provides a means to predict any possible failure of a potential ADSL service and/or an ADSL modem test on a telephone cable when an ADSL modem test would fail with the cable.

In a major aspect, the invention comprises a method for performing a DMT test to determine cable data rates using two. test devices, without employing ADSL modems, on a telephone cable or a local loop cable for ADSL application, whereby the available frequency bandwidth is divided into sub-channels, the method comprising the steps of synchronizing a transmitter and receiver in each of the two test devices at lower frequency signals, measuring the frequency characteristics of the cable with test signals, measuring cable noise and interference for every sub-channel, determining a theoretical and practical data rate for every sub-channel based on the measured frequency and noise characteristics, and modem parameters selected by the user, and determining the theoretical and practical data rates for the ADSL bandwidth based on an ADSL DMT standard selected by the user.

In additional aspects of the invention:

(a) the test signals and cable noise are converted into digital form at the receivers for processing;

(b) coded or modulated signals are employed for passing information between the two test devices for test parameters, such as ADSL standard and selected modem parameters, and test results;

(c) the step of synchronizing the two test devices at lower frequencies comprises the steps of synchronizing two test devices in a tone, or a modulated signal, of voice band frequencies, sending a synchronization signal at up to the maximum power allowable for the cable under test, and adjusting the AGC setting of the receiver for synchronization signal;

(d) the step of synchronizing the two test devices at lower frequencies comprises the steps of synchronizing two test devices in a tone, or a modulated signal of frequencies close to voice band, or lower frequencies in the ADSL frequency band, sending a synchronization signal at up to the maximum frequency allowable for the cable under test, and adjusting the AGC setting of the receiver for the synchronization signal;

(e) a time-domain, or frequency-domain analysis method is used for detecting and receiving the synchronization signal;

(f) the step of measuring the frequency characteristics of the cable with discrete tones comprises the steps of sending individual test tones, one tone at a time, at up to the maximum power allowable for the cable under test, adjusting the AGC setting of the receivers for each sub-channel accordingly, measuring the attenuation characteristics of the cable for each sub-channel, and calculating the frequency characteristics of the cable for each sub-channel;

(g) the step of measuring the frequency characteristics of the cable with discrete tones comprises the steps of sending individual test tones, a few tones at a time, at up to the maximum power allowable for the cable under test, adjusting the AGC setting of the receivers for the few sub-channels accordingly, measuring the attenuation characteristics of the cable for each sub-channel, and calculating the frequency characteristics of the cable for each sub-channel;

(h) a time-domain or frequency-domain analysis method is used for detecting and receiving the test signals;

(i) the step of measuring the cable noise and interference for every sub-channel comprises the steps of measuring the level or energy level of the cable noise and interference for sub-channels of upstream and downstream respectively at the two test devices connected for the test, and adjusting the AGC setting of the receivers when required;

(j) the step of measuring the cable noise and interference for every sub-channel comprises the steps of measuring the level or energy level of the cable noise and interference for all sub-channels of the whole ADSL bandwidth at the one or two test devices connected for the test, and adjusting the AGC setting of the receivers when required;

(k) a time-domain or frequency-domain analysis method is used for measuring the cable noise and interference;

(l) the step of determining the theoretical and practical data rates for every sub-channel based on the measured frequency and noise characteristics, and modem parameters selected by the user comprises the steps of converting the measured signal level at the receiver input of the test devices to the signal level of an ADSL modem receiver for each sub-channel, calculating the optimum signal-to-noise ratio ($SNR_o$) of each sub-channel, calculating the practical signal-to-noise ratio ($SNR_p$) of each sub-channel according to the ADC (Analog to Digital Converter) resolution selected by the user for the target ADSL modem, determining the theoretical data rates from the calculated $SNR_o$. for each sub-channel for the modem parameters selected by the user, and determining the practical data rates from the calculated $SNR_p$ for every sub-channel for the modem parameters selected by the user;

(m) the step of determining the theoretical and practical data rates for the ADSL bandwidth based on an ADSL DMT standard selected by the user comprises the steps of estimating the theoretical and practical data rates of upstream at U-C according to the ADSL DMT standard selected by the user, estimating the theoretical and practical data rates of downstream at U-R according to the ADSL DMT standard selected by the user, and estimating the theoretical and practical data rates of the whole ADSL bandwidth according to the ADSL DMT standard selected by the user;

(n) the step of determining the theoretical and practical data rates for the ADSL bandwidth based on an ADSL DMT standard selected by the user comprises the step of estimating the theoretical and practical data rates of upstream and downstream at U-C or U-R or both sides according to the ADSL DMT standard selected by the user;

(o) the steps of determining a theoretical and practical data rate for every sub-channel based on the measured frequency and noise characteristics, and modem parameters selected by the user, and determining the theoretical and practical data rates for the ADSL bandwidth based on an ADSL DMT standard selected by the user, further include predicting any possible failure of a potential ADSL service and/or an ADSL modem test on a cable when a pair of ADSL modems would fail to synchronize over it;

(p) the steps of determining a theoretical and practical data rate for every sub-channel based on the measured frequency and noise characteristics, and modem parameters selected by the user, and determining the theoretical and practical data rates for the ADSL bandwidth based on an ADSL DMT standard selected by the user further include analysing the failure of an ADSL service and/or an ADSL modem test by showing, in text or graphic format, the converted measured signal levels, measured cable noise levels, and/or the bits allocated, for each sub-channel of ADSL bandwidth or for those sub-channels used by a pair of ADSL modems for synchronization purposes.

Further aspects of the invention will become apparent from the description of an illustrative embodiment which follows.

DETAILED DESCRIPTION OF THE INVENTION

A typical ADSL DMT modem test and the present DMT test method will be described, referring to the attached drawings.

For description convenience, it has been assumed that the ADSL standard is ANSI T1.413 and frequency division multiplexing (FDM) is used for downstream-upstream separation. For other ADSL DMT standards and/or other forms of downstream-upstream separation, the tests will work similarly with certain different test signal frequencies.

Figure 1:
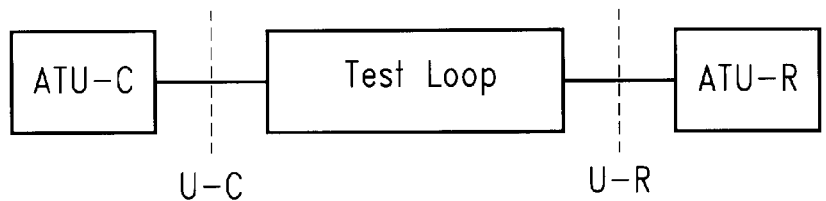
FIG. 1 illustrates, in block diagram form, a test setup for an ADSL modem test on a local loop.

FIG. 1 shows an ADSL modem test. At the beginning of the test, the pair of ADSL modems will try to initiate a communications link as follows:

(a) The ATU-C, after power-up or loss of signal, and an optional self-test, may transmit activation tones and await a response from the ATU-R. It makes no more than two attempts; if no response is received it will wait for an activation request from the ATU-R or an instruction from the network to retry;

(b) The ATU-R, after power-up and an optional self-test, may repeatedly transmit an activate request. If, however, the ATU-R receives C-TONE (a single frequency sinusoid) it will remain silent for approximately one minute, unless it detects an activation signal.

Once the communication link is established, the ATU-C transmits a C-Activate (one of a set of single frequency signals) signal to start loop timing between the two modems. Loop timing is defined as the combination of the slaving of an ADC (Analog to Digital Converter) clock of one modem to its received signal which is sent by the other modem, and tying the local DAC (Digital to Analog Converter) and ADC clocks together.

After the loop timing, the two modems begin sending and receiving mutual training signals to train any receiver equalizer, to adjust automatic gain control (AGC) and to perform channel analysis with several option settings. Then, wideband pseudo-random signals are sent and received by the two modems to measure the downstream SNR at ATU-R and the upstream SNR at the ATU-C. Two significant facts related with the SNR measurement will be referred to later when compared with the present DMT test method:

(a) The AGC of each modem is set to an appropriate level for a wideband test signal of frequencies allowed for the modem;

(b) The SNR for each sub-channel is measured at the above AGC setting with a wideband pseudo-random signal.

With a performance margin of 6 dB at an error rate of $10^{-7}$, the ATU-C calculates the highest upstream data rate based on the measured SNRs for upstream channels, while the ATU-R calculates the highest downstream data rate based on the measured SNRs for downstream channels.

The formula used to estimate the bits, in units of bits/symbol/Hz, that can be allocated to a sub-channel is $$b_j = \log_2(1 + SNR_j/\Gamma) \qquad (1)$$

where $SNR_j$ is the signal to noise and distortion ratio in power ratio for sub-channel j. For an uncoded system with 0 dB performance margin and an error rate of $10^{-7}$, $\Gamma$ is 9.8 dB or 9.55 in terms of power ratio. For a performance margin of 6 dB at an error rate of $10^{-7}$, the value of $\Gamma$ is 15.8 dB or 38.02 in terms of power ratio. In an ADSL system, error correction coding and advanced bit loading algorithms can be used to improve system performance. For a coding gain of 3 dB, $\Gamma$ will be 12.8 dB or 19.0 in terms of power ratio. The maximum upstream data rate and downstream data rate can then be calculated by summing up $b_j$ for all the sub-channels allocated for upstream and downstream respectively.

During the whole process of a modem test, the two ADSL modems employ some of the twelve tones ranging from 34.5 kHz to 310.5 kHz at a level of −1.65 dBm (decibel referenced to one milliwatt) to −3.65 dBm at 100 ohm to handshake and to maintain synchronization with each other. If, for any reason, the cable noise, interference and/or attenuation at any of these frequencies are too high, a pair of typical ADSL modems will fail to synchronize to complete the ADSL modem test.

According to the invention, a DMT test is performed which is equivalent to a number of ADSL DMT modem tests without invoking a pair of ADSL modems. To be able to predict a possible modem test failure, the invented DMT test employs a reliable means to establish and maintain synchronization to complete the test. To estimate the theoretical and practical data rates for the whole bandwidth based on the ADSL DMT standard and modem parameters, the invented DMT test measures and calculates the SNR for each sub-channel for the optimum and various practical AGC settings and ADC resolutions.

The choice of the same synchronization tones and levels used by an ADSL modem for the DMT test is subject to the same problem that the modem test faces; cable noise, interference and/or attenuation at any of these frequencies will cause synchronization failure. For ordinary telephone cables, the attenuation at voice band frequency is much less than that at ADSL modem synchronization frequencies. A typical AWG (American Wire Gauge) 24 telephone wire with no load coils inserted has an attenuation of 3.97 dB/mile at 3 kHz and an attenuation of 20.149 dB/mile at 300 kHz which is close to the highest synchronization frequency used by a pair of ADSL modems. By synchronizing two devices at one tone, or more than one tone if required, of voice band frequencies or lower frequencies, the DMT test of the invention provides a reliable means to establish and maintain synchronization to complete the test even in the situation where a pair of ADSL modems would fail to synchronize.

With the optimum AGC setting, actual AGC setting, and actual ADC resolution for each sub-channel in mind, significant facts (in addition to the two significant facts previously pointed out related with the SNR measurement in an ADSL modem test) include:

(a) The ADSL modems are measuring the SNR for each sub-channel based on the single AGC setting, i.e. an optimum AGC setting for a compound upstream or downstream signal with many modulated tones of different frequencies; therefore, (b) The actual ADC resolution applied to each sub-channel can be less than the normal ADC resolution of a given ADSL modem. In other words, the actual quantization noise for some sub-channels may not be negligible in the SNR calculation;

(c) A pair of ideal ADSL modems with infinite bits of ADC resolution will have an optimum AGC setting for each sub-channel and the quantization noise for each sub-channel will be zero or negligible in the SNR calculation;

(d) Ideal ADSL modems will provide the highest or the theoretical data rates of upstream and downstream for a local loop;

(e) It is not possible for an ADSL modem test to estimate theoretical data rates of upstream and downstream since an optimum AGC setting is not possible for each sub-channel;

(f) It is not possible for an ADSL modem test to estimate the practical data rates of upstream and downstream for an ADSL modem with different ADC resolution since the actual ADC resolution for each sub-channel is not the same;

(g) Future ADSL modems could have a higher ADC resolution than current ones to provide data rates closer to the theoretical ones.

Suppose two test devices are equipped with the same ADC resolution as the target ADSL modems. Also, the two devices work in a similar way as a pair of ADSL modems do by adjusting an optimum AGC setting for a compound upstream or downstream signal and then measuring the SNR for each sub-channel. They should be able to produce good data rate estimations of upstream and downstream for the local loop with the target modems, provided that the calculation of $b_j$ is based on the same performance margin, coding gain, etc. On the other hand, the above two devices are useful only for those target ADSL modems with the same ADC resolution. Also, it is not possible for the two devices to estimate theoretical data rates of upstream and downstream since an optimum AGC setting is not possible for each sub-channel.

Figure 2:
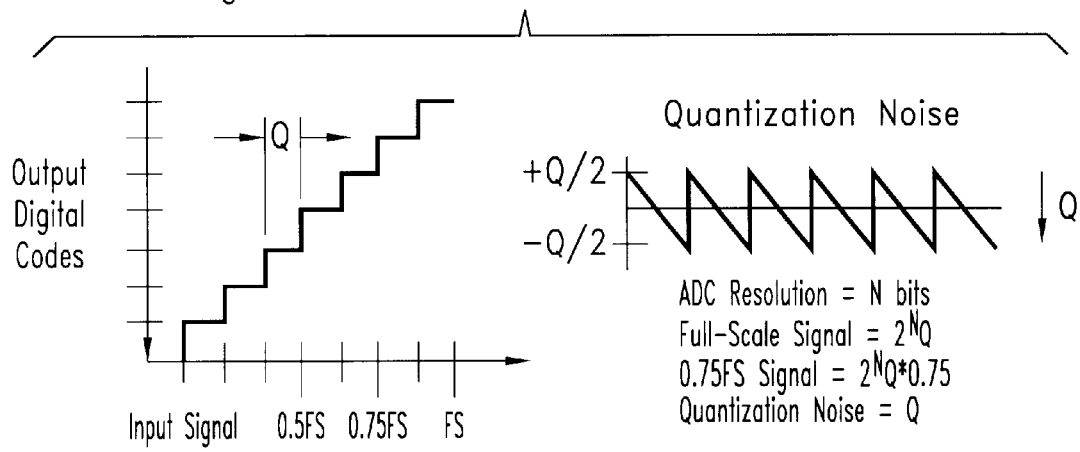
FIG. 2 illustrates the Signal to Quantization Noise Ratio of an ADC.

Therefore, the invented DMT test method will measure the frequency characteristics of a cable with discrete tones. Each tone is sent at the maximum power allowable for sending a single tone and the AGC setting of the receiver will be adjusted for each sub-channel accordingly. Assuming that the optimum AGC is so set that the received signal for each sub-channel at ADC is at least half of the full-scale signal, the SNR to quantization noise for each sub-channel can be calculated as illustrated in FIG. 2. For a typical 12-bit ADC, the Vpp (peak-to-peak voltage) of 75% full-scale received signal is $2^{12} \times 0.75 = 3072Q$, where Q stands for 1 Quantization Unit, and the Vpp of quantization noise is 1Q. Hence, the SNR to quantization noise alone is $$SNR_{qn0.75} = V_{pp0.75}/V_{pp-qn} = 3072 \text{ or } 69.748 \text{ dB}$$

According to equation (1), this SNR allows the sub-channel to be allocated up to 17.92 bits for 6 dB performance margin at an error rate of $10^{-7}$ without any coding gain. By sending individual tones at the maximum power, one gains extra SNR to background noise as much as possible. When converting the signal level to the same one as an ADSL modem, an ADC resolution of 12 bits or higher will guarantee 17.92 bits or higher resolution with 6 dB performance margin if the quantization noise is considered for each sub-channel. Since the maximum number of bits per sub-channel is limited to 15 bits, the quantization noise is negligible when calculating the SNR of a sub-channel. After measuring the cable noise and interference for every sub-channel, the SNR obtained for each sub-channel by the method of the invention will be close to one which would be obtained by an ideal ADSL modem.

Figure 3:
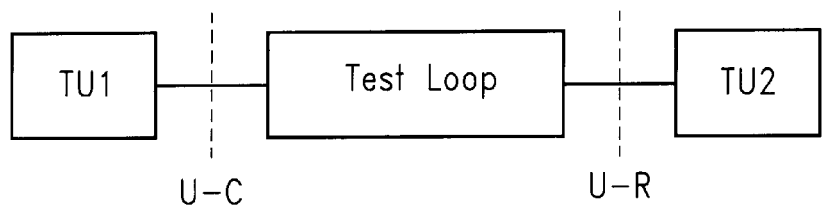
FIG. 3 illustrates, in block diagram form, a test setup for a DMT test on a local loop.

FIG. 3 shows a test setup when two devices of the invention are carrying out a DMT test on a local loop. Test Unit 1 (TU1) is a test device connected to U-C, the loop interfaces at the CO site, while Test Unit 2 (TU2) is the one connected to U-R, the loop interfaces at the customer premise site. The two test units may be identical, or one of them may be just a remote slave transponder or responder unit.

For example, suppose the user chooses TU2 ATU-R as the master unit to initiate a DMT test. Referring to the example flow diagrams shown in FIG. 4 and FIG., TU2 first sends out a synchronization tone of voice band frequency to wake-up and synchronize with TU1. Then, TU2 sends a coded signal to tell TU1 the ADSL standard and various modem parameters for the test, such as performance margin, coding/loading gain, ADC resolution, upstream/downstream direction, etc. In this example, the upstream is from TU2 to TU1 and the downstream is from TU1 to TU2. TU1 will acknowledge to TU2 after being synchronized with TU2 and having decoded the test parameters. TU1 and TU2 send individual tones at the maximum power to allow the other unit to adjust its AGC setting for each sub-channel. The cable noise can be measured before receiving the tones, measured after receiving the tones or measured continuously. By converting the received signal levels to the same ones as an ADSL modem, the receiver units will calculate the SNR and the $b_j$ for each sub-channel. Such calculated SNR and $b_j$ are close to the ones which would be obtained by an ideal ADSL modem. For TU1, the theoretical maximum upstream data rate can be calculated by summing up $b_j$ times 4 kHz for all the sub-channels allocated for upstream. Similarly, TU2 can calculate the theoretical maximum downstream data rate.

When requested to estimate the practical upstream and downstream data rates, the receiver units have to convert the theoretical SNRs obtained above to the practical ones for the ADC resolution of a target ADSL modem selected by a user. Since the target ADSL modem can only have a single optimum AGC setting for a compound upstream or downstream signal, the received signal at ADC input of a specific sub-channel can be considered at 75% full-scale while the signals of other sub-channels are smaller depending on the cable attenuation. Take an ADSL modem parameter of 12-bit ADC as an example, when calculating the SNRs for all sub-channels of upstream, the sub-channel with the least attenuation is considered the reference sub-channel. The maximum signal level of the reference sub-channel is considered as being a signal of 75% full-scale for the single optimum AGC setting. Referring to FIG. 2, the SNR to quantization noise of this reference sub-channel, $SNR_{ref}$, is 69.748 dB. For any other sub-channel j, the actual $SNR_{jqn}$ to quantization noise in dB will be calculated based on the attenuation difference between the reference sub-channel and the sub-channel j as follows:

$$SNR_{jqn} = SNR_{ref} - (\text{Attenuation}_j - \text{Attenuation}_{ref}) \qquad (2)$$

The measured cable noise and interference will be used to calculate the $SNR_{jn}$ to cable noise. The smaller of $SNR_{jqn}$ and $SNR_{jn}$ will be used in equation (1) to estimate the $b_j$ for sub-channel j. By summing up all $b_j$ for all the sub-channels allocated for upstream, the practical upstream data rate can then be estimated at TU1. A similar process is involved when estimating the practical downstream data rate at TU2.

When both estimates are complete, TU1 and TU2 exchange the data rate information. By the end of the DMT test, either the master unit or both units will show the theoretical and the practical data rates of upstream and downstream.

Figure 4:
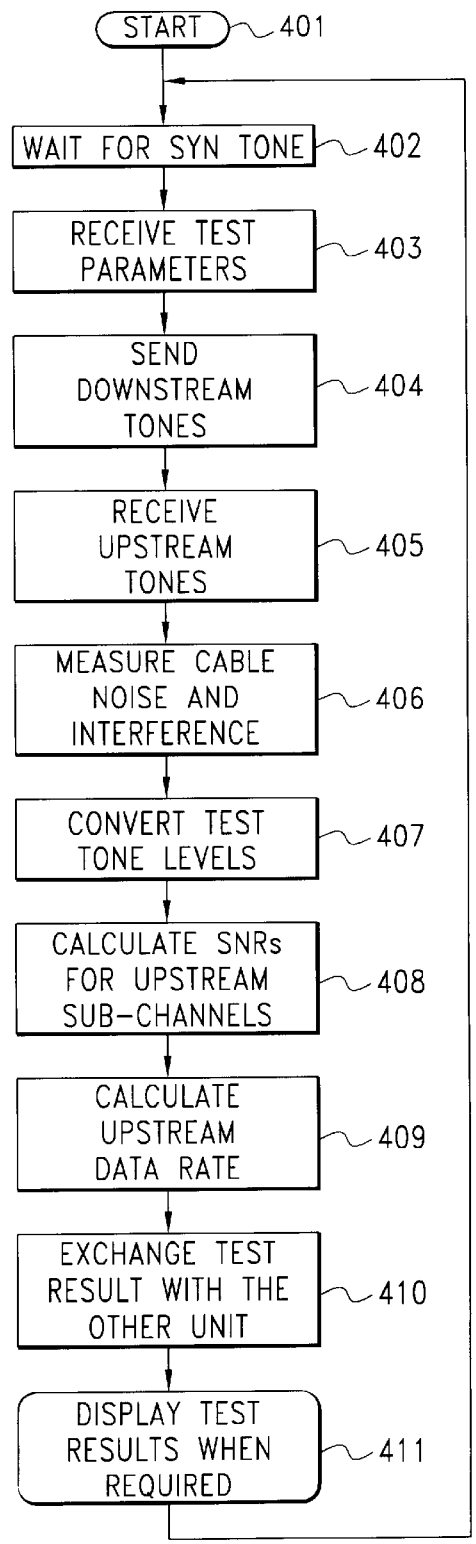
FIG. 4 illustrates, in flow diagram form, an example test device of the invention at U-C working at FDM mode in a DMT test on a local loop.
Figure 5:
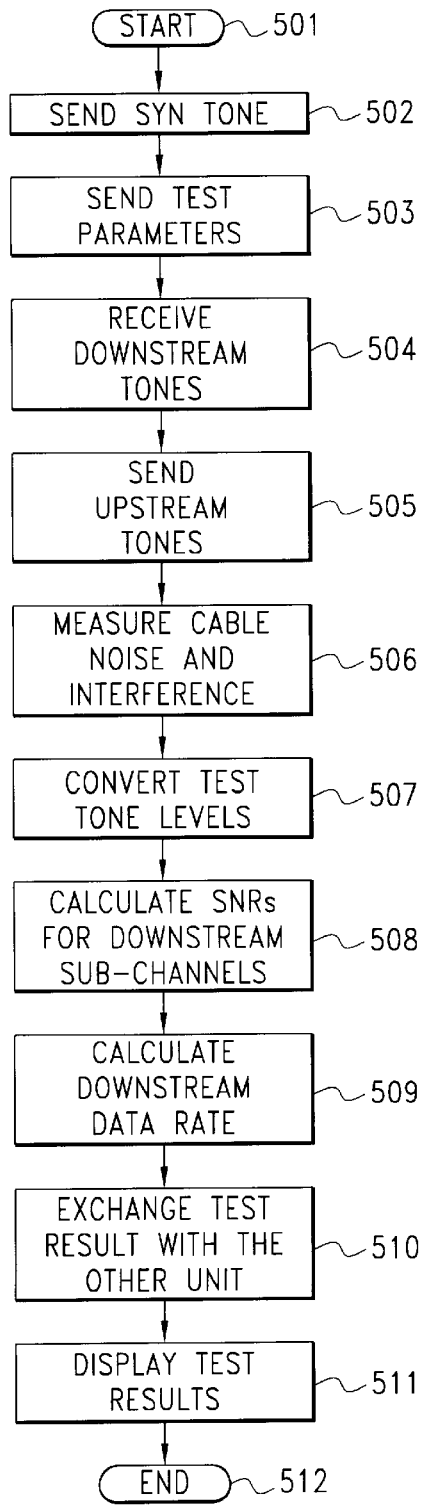
FIG. 5 illustrates, in flow diagram form, an example test device of the invention at U-R working at FDM mode in a DMT test on a local loop.

In the examples shown in FIG. 4 and FIG., before a test is initiated, TU1 is waiting at step 402 for a synchronization tone or signal to wake up. The user starts a DMT test at TU2 and inputs the test parameters, such as ADSL standard, performance margin, coding/loading gain, ADC resolution, upstream/downstream direction, etc. TU2, at step 502, first sends out a synchronization tone of voice band frequency to wake-up and synchronize with TU1 so that both units have accurate timing for the rest of the test. Then at step 503, TU2 sends a coded signal to tell TU1, at step 403, the various parameters for the test. TU1 will acknowledge to TU2 after being synchronized with TU2 and having decoded the test parameters. TU1, at step 404, sends individual downstream tones at the maximum power to allow TU2, at step 504, to adjust its AGC setting for each downstream sub-channel. TU2, at step 505, sends individual upstream tones at the maximum power to allow TU1, at step 405, to adjust its AGC setting for each upstream sub-channel. TU1, at step 406, and TU2, at step 506, measure the cable noise and interference at both ends of the cable. By converting the received upstream tone signal level, at step 407, to the same one of an ADSL modem, TU1 will calculate the SNR and $b_j$, at step 408, for each upstream sub-channel. By converting the received downstream tone signal level, at step 507, to the same one of an ADSL modem, TU2 will calculate the SNR and $b_j$, at step 508, for each downstream sub-channel. For TU1, at step 409, the theoretical maximum upstream data rate and practical upstream data rate can be calculated. Similarly, TU2, at step 509, can calculate the theoretical maximum downstream data rate and practical downstream data rate. At step 410 and step 510, TU1 and TU2 exchange the calculated data rates and other information by sending coded signals over the cable under test. At step 411, TU1 will display the test result, if required, and then go back to step 402 waiting for another test. At step 511, TU2 displays the test result.

Because the test devices of the invention are synchronized via tones at voice band frequency or lower frequencies, the DMT test will be completed even under the situation that a pair of ADSL modems would fail to synchronize. By comparing the converted signal levels to the cable noise and interference levels at the synchronization frequencies used by an ADSL modem test, TU1 and TU2 are able to tell the user whether a pair of ADSL modems will fail to complete an ADSL modem test. By displaying the actual signal levels and measured noise and interference levels for each sub-channel, TU1 and TU2 can also let the user see what is the cause for such failure of an ADSL modem test.

Although an illustrative embodiment of the invention has been described in detail, modifications of the invention will be apparent to persons skilled in the art without departing from the scope and spirit of the invention.

What is claimed is:

1. A method for performing a DMT test to determine cable data rates using two test devices, without employing ADSL modems, on a telephone cable or a local loop cable for ADSL application, whereby an available frequency bandwidth is divided into sub-channels, the method comprising the steps of:
   (a) synchronizing a transmitter and receiver in each of the two test devices at lower frequency signals;
   (b) measuring the frequency characteristics of the cable with test signals;
   (c) measuring cable noise and interference for every sub-channel;
   (d) determining a theoretical and practical data rate for every sub-channel based on the measured frequency and noise characteristics, and modem parameters selected by a user; and
   (e) determining the theoretical and practical data rates for the ADSL bandwidth based on an ADSL DMT standard selected by the user.

2. The method of claim 1, wherein the test signals and cable noise are converted into digital form at the receivers for processing.

3. The method of claim 1, wherein coded or modulated signals are employed for passing information between the two test devices for test parameters, such as ADSL standard and selected modem parameters, and test results.

4. The method of claim 1, wherein the step of synchronizing the two test devices at lower frequencies comprises the steps of:
   (i) synchronizing two test devices in a tone, or a modulated signal, of voice band frequencies;
   (ii) sending a synchronization signal at up to the maximum power allowable for the cable under test; and
   (iii) adjusting the AGC setting of the receiver for synchronization signal.

5. The method of claim 1, wherein the step of synchronizing the two test devices at lower frequencies comprises the steps of:
   (iv) synchronizing two test devices in a tone, or a modulated signal, of frequencies close to voice band, or lower frequencies in the ADSL frequency band;
   (v) sending a synchronization signal at up to the maximum power allowable for the cable under test; and
   (vi) adjusting the AGC setting of the receiver for the synchronization signal.

6. The method of claim 4, wherein a time-domain or frequency-domain analysis method is used for detecting and receiving the synchronization signal.

7. The method of claim, wherein a time-domain or frequency-domain analysis method is used for detecting and receiving the synchronization signal.

8. The method of claim 1, wherein the step of measuring the frequency characteristics of the cable with discrete tones comprises the steps of:
   (vii) sending individual test tones, one tone at a time, at up to the maximum power allowable for the cable under test;
   (viii) adjusting the AGC setting of the receivers for each sub-channel accordingly;
   (ix) measuring the attenuation characteristics of the cable for each sub-channel; and
   (x) calculating the frequency characteristics of the cable for each sub-channel.

9. The method of claim 1, wherein the step of measuring the frequency characteristics of the cable with discrete tones comprises the steps of:
   (xi) sending individual test tones, a few tones at a time, at up to the maximum power allowable for the cable under test;
   (xii) adjusting the AGC setting of the receivers for the few sub-channels accordingly;
   (xiii) measuring the attenuation characteristics of the cable for each sub-channel; and
   (xiv) calculating the frequency characteristics of the cable for each sub-channel.

10. The method of claim 8, wherein a time-domain or frequency-domain analysis method is used for detecting and receiving the test signals.

11. The method of claim 9, wherein a time-domain or frequency-domain analysis method is used for detecting and receiving the test signals.

12. The method of claim 1, wherein the step of measuring the cable noise and interference for every sub-channel comprises the steps of:
   (xv) measuring the level or energy level of the cable noise and interference for sub-channels of upstream and downstream respectively at the two test devices connected for the test; and
   (xvi) adjusting the AGC setting of the receivers when required.

13. The method of claim 1, wherein the step of measuring the cable noise and interference for every sub-channel comprises the steps of:
   (xvii) measuring the level or energy level of the cable noise and interference for all sub-channels of the whole ADSL bandwidth at the one or two test devices connected for the test; and
   (xviii) adjusting the AGC setting of the receivers when required.

14. The method of claim 12, wherein a time-domain or frequency-domain analysis method is used for measuring the cable noise and interference.

15. The method of claim 13, wherein a time-domain or frequency-domain analysis method is used for measuring the cable noise and interference.

16. The method of claim 1, wherein the step of determining the theoretical and practical data rates for every sub-channel based on the measured frequency and noise characteristics, and modem parameters selected by the user comprises the steps of:

(xix) converting the measured signal level at the receiver input of the test devices to the signal level of an ADSL modem receiver for each sub-channel;

(xx) calculating the optimum signal-to-noise ratio ($SNR_o$) of each sub-channel, (xxi) calculating the practical signal-to-noise ratio ($SNR_p$) of each sub-channel according to the ADC resolution selected by the user for the target ADSL modem;

(xxii) determining the theoretical data rates from the calculated $SNR_o$ for every sub-channel for the modem parameters selected by the user; and (xiii) determining the practical data rates from the calculated $SNR_p$ for every sub-channel for the modem parameters selected by the user.

17. The method of claim 1, wherein the step of determining the theoretical and practical data rates for the ADSL bandwidth based on an ADSL DMT standard selected by the user comprises the steps of:

(xxiv) estimating the theoretical and practical data rates of upstream ATU-C according to the ADSL DMT standard selected by the user;

(xxv) estimating the theoretical and practical data rates of downstream ATU-R according to the ADSL DMT standard selected by the user; and (xxvi) estimating the theoretical and practical data rates of the whole ADSL bandwidth according to the ADSL DMT standard selected by the user.

18. The method of claim 1, wherein the step of determining the theoretical and practical data rates for the ADSL bandwidth based on an ADSL DMT standard selected by the user comprises the step of estimating the theoretical and practical data rates of upstream and downstream ATU-C or U-R or both sides according to the ADSL DMT standard selected by the user.

19. The method of claim 1, wherein steps (d) and (e) further include predicting any possible failure of a potential ADSL service and/or an ADSL modem test on a cable when a pair of ADSL modems would fail to synchronize over it.

20. The method of claim 1, wherein steps (d) and (e) further include analyzing the failure of an ADSL service and/or an ADSL modem test by showing, in text or graphic format, the converted measured signal levels, measured cable noise levels, and/or the bits allocated, for each sub-channel of ADSL bandwidth or for those sub-channels used by a pair of ADSL modems for synchronization purposes.

* * * * *